June 26, 1962     E. C. HARTLEY     3,040,800
TUBE FLARING TOOL
Filed Oct. 16, 1958     4 Sheets-Sheet 1
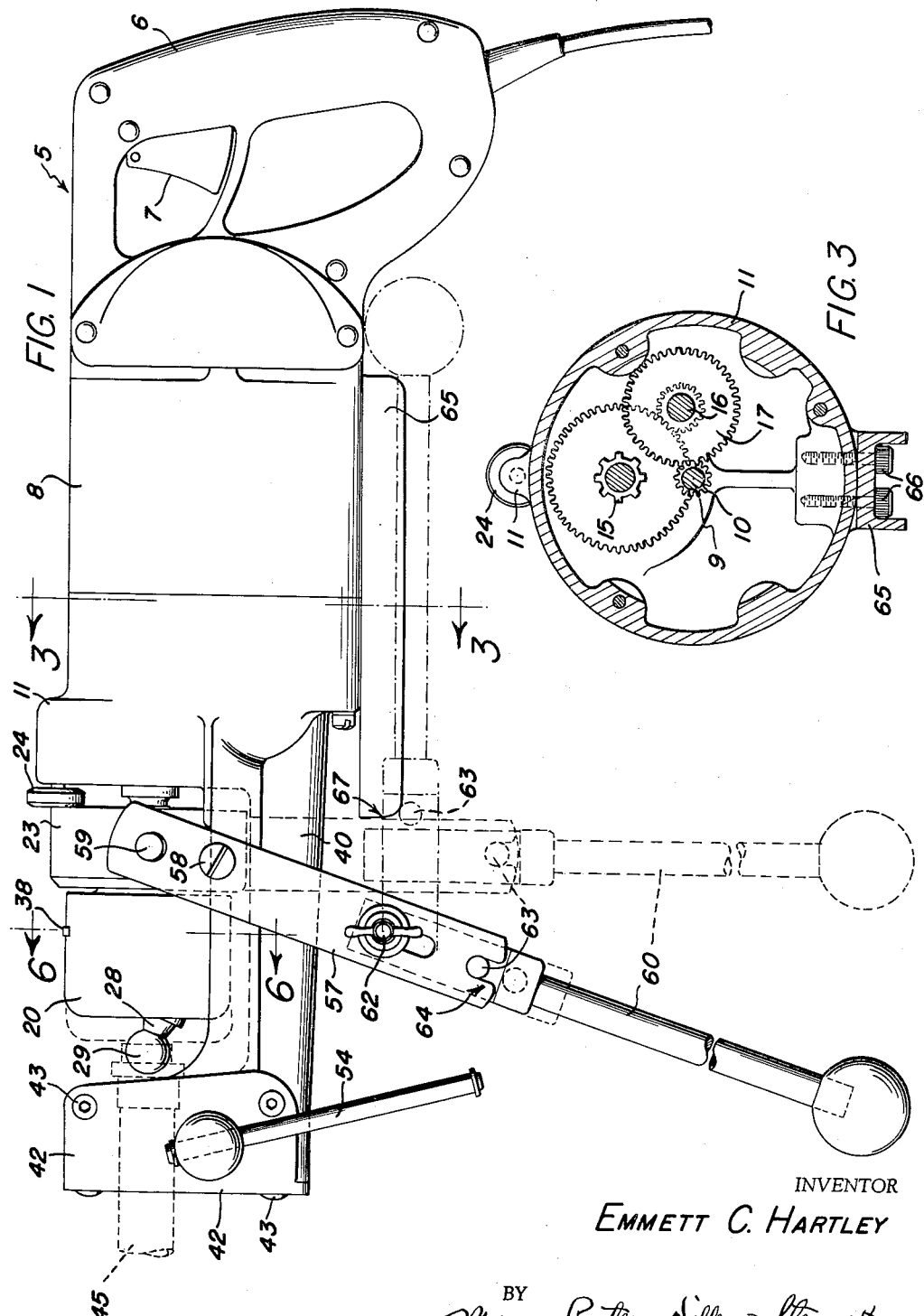
INVENTOR
EMMETT C. HARTLEY
BY
Mason, Porter, Diller & Stewart
ATTORNEYS

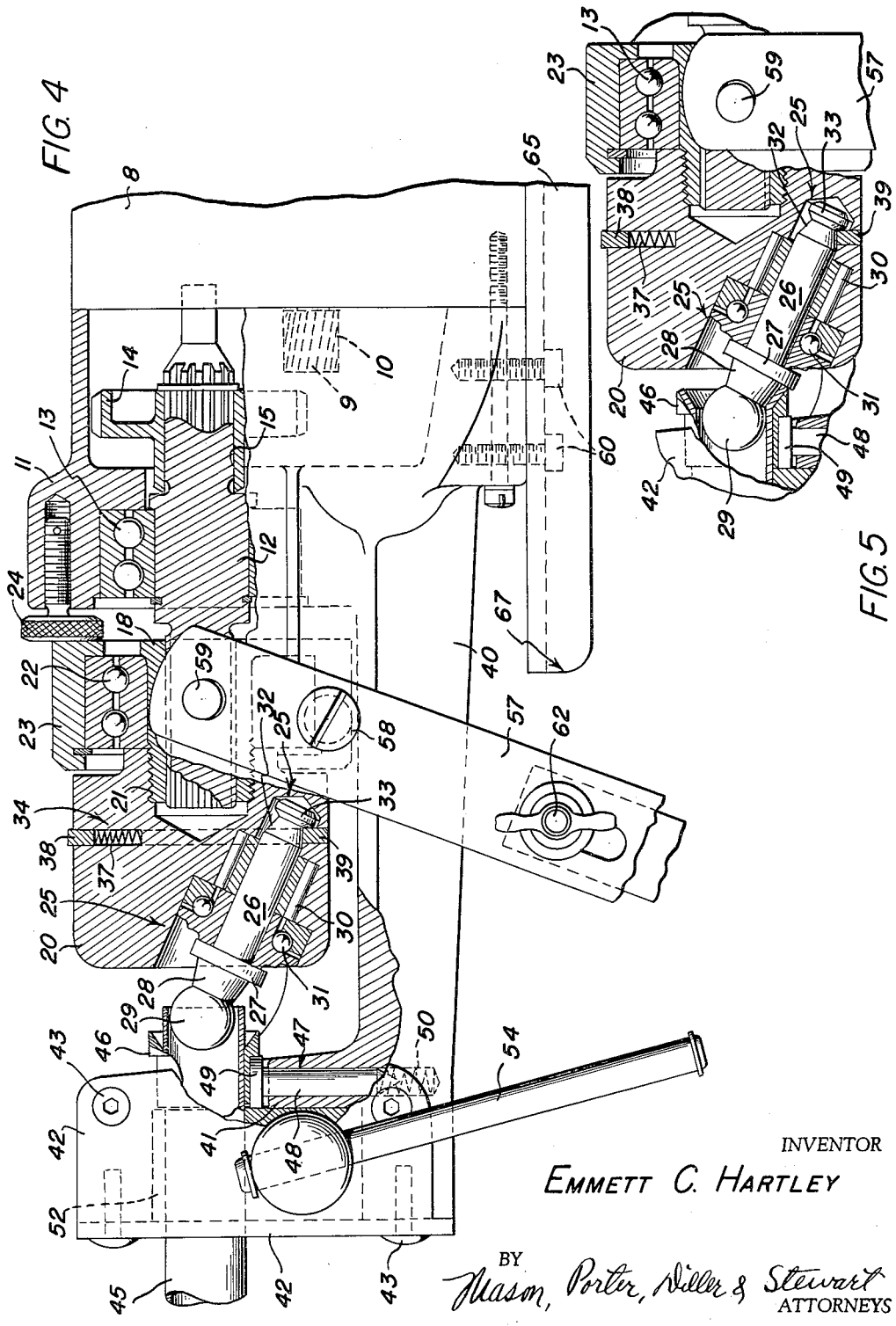

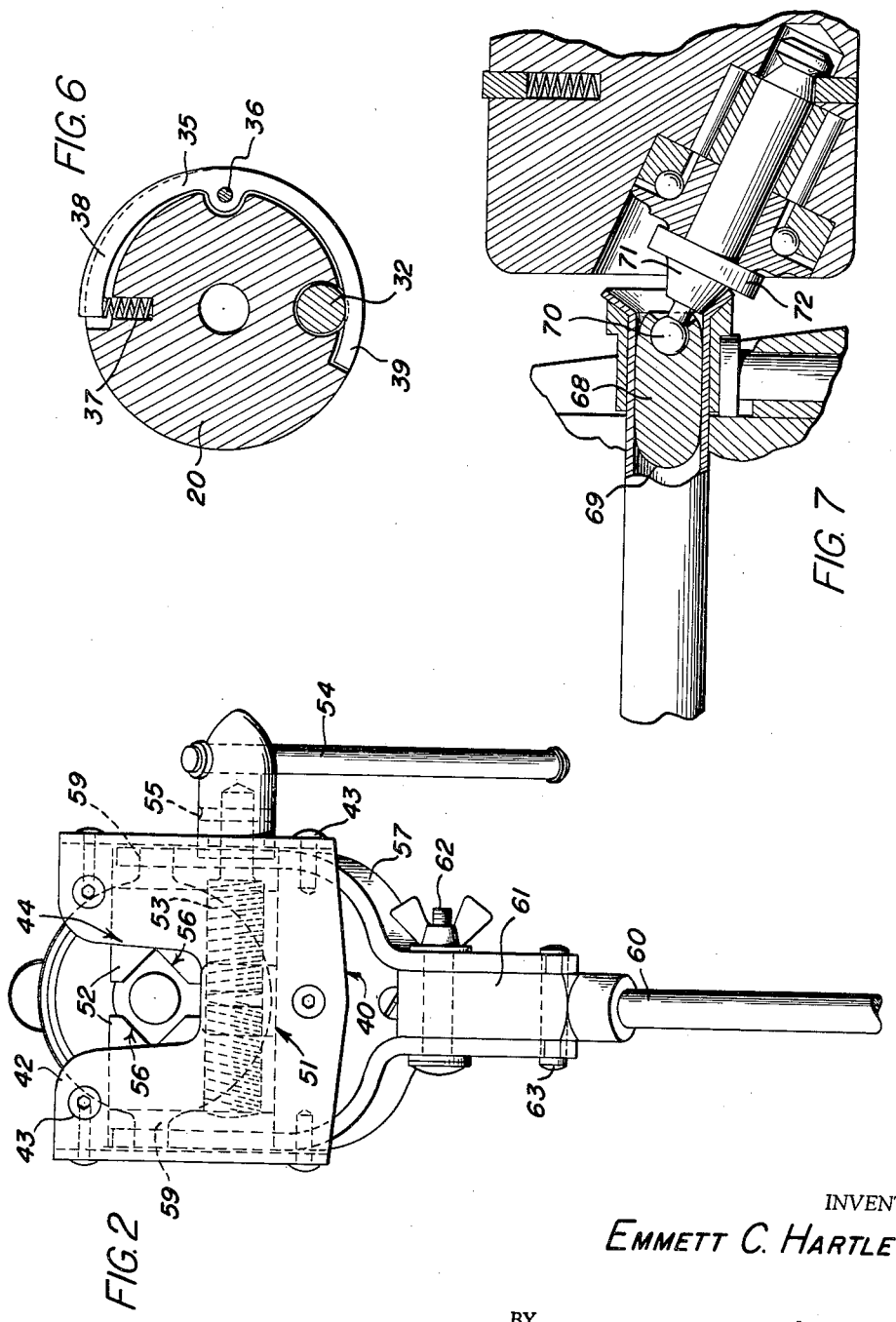

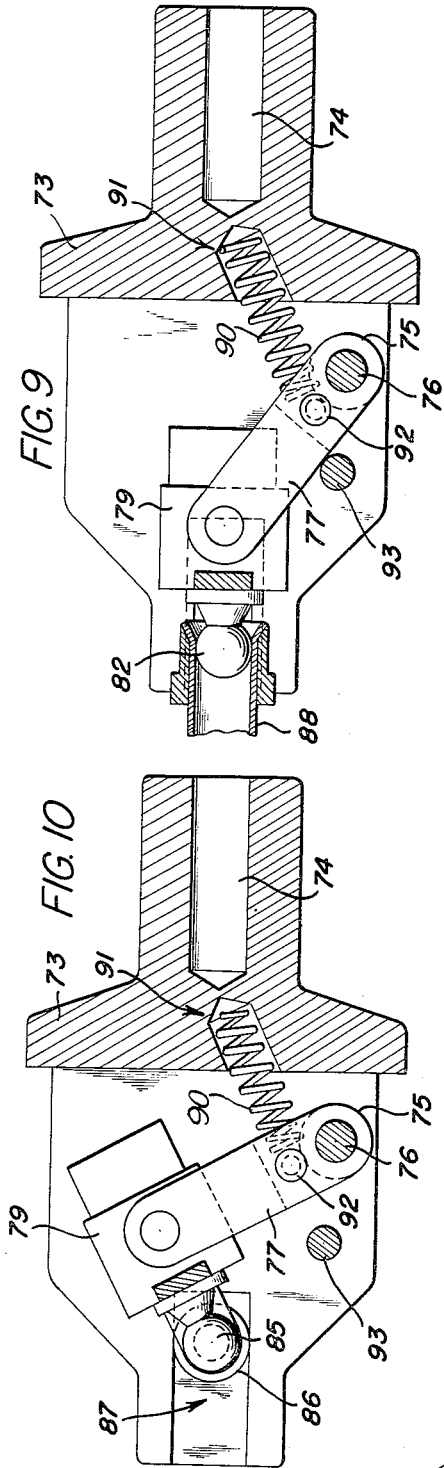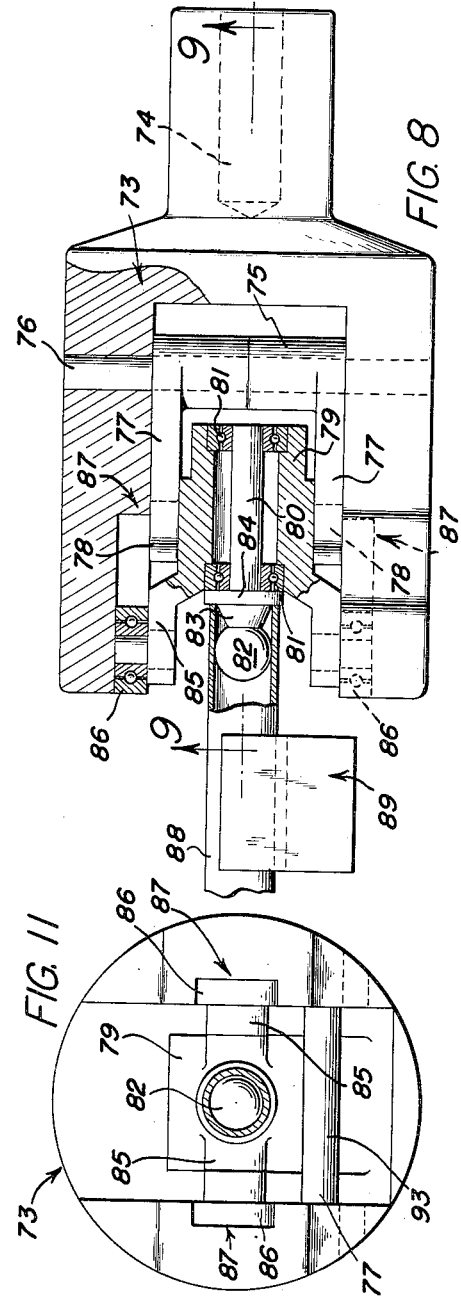
INVENTOR
EMMETT C. HARTLEY
BY
Mason, Porter, Diller & Stewart
ATTORNEYS

United States Patent Office 3,040,800
Patented June 26, 1962

3,040,800
TUBE FLARING TOOL
Emmett C. Hartley, Euclid, Ohio, assignor to Parker-Hannifin Corporation, Cleveland, Ohio, a corporation of Ohio
Filed Oct. 16, 1958, Ser. No. 767,569
18 Claims. (Cl. 153—79)

The invention relates generally to tube flaring means and primarily seeks to provide a novel hand operated, power driven tube flaring tool in which the flaring of tubes can be performed rapidly and very accurately.

While adaptable for more general usage, the invention has reference more particularly to flaring tube ends and assembling them in the sleeves which form a part of the tube securing means in fittings well known in the art as triple fittings and which are exemplified in U.S. Letters Patents 1,893,442 and 2,212,183 issued to Arthur L. Parker on January 3, 1933, and August 20, 1940, respectively. In fittings of this character there are included threadably connected coupling members which cooperate in providing a chamber in which to receive the flared end of the tube to be secured, one said member having a coniform extension for engaging in the tube flare within the chamber, and the other said member having a shoulder engageable with a shoulder on a clamping sleeve constituting the third member of the fitting and surrounding the tube within the chamber and having a flared surface engageable with the tube flare for clamping the same against the coniform extension as the sleeve is moved longitudinally by reason of the engagement of the shoulders during threading together of the members.

An object of the invention is to provide a tube flaring tool of the character stated wherein is employed a ball having its center disposed on the axis of the tube to be flared and in reaction contact within the tube, and a frusto-cone flaring extension swingable about the center of the ball so that the frusto-cone axis describes a frusto-cone figure of rotation as the tube flaring is in progress, said figure of rotation being accurately held on a center line of rotation forming a coaxial extension of the center line of the tube being flared.

Another object of the invention is to provide a flaring tool of the character stated wherein is included means for clamping the tube to be flared, means forming a rest and stop for the shouldered sleeve in which the tube is to be flared, a rotor in which the ball and frusto-cone flaring element is carried in position for having its axis describe the desired frusto-cone figure of rotation, means for imparting rotation to the rotor, and means for advancing the flaring element into the tube to accomplish the desired flaring of the tube progressively.

Another object of the invention is to provide novel means for removably and replaceably mounting the flaring element in the rotor so that flaring elements of selective sizes may be used.

Another object of the invention is to provide in a tool of the character stated, an elongated reaction member dimensioned to snugly but slidably engage in the tube to be flared and swivelly connected to the frusto-cone flaring element along the axis of the tube and serving primarily to provide a longer surface along which to take the reaction forces developed in the flaring action than is provided on the ball forms of reaction extensions, and secondarily as a surface opposing the tube clamping action and preventing tube crushing when thin tubes are being worked.

A further object of the invention is to provide a tube flaring tool of the character stated wherein the means for advancing the flaring element includes a swingably mounted lever having axial shifting connection with the rotor, there also being included adjustable means for stopping shifting movement of the lever at a predetermined point to determine the limit of flare, and provision being made for collapsing the lever in compacting relation to the remainder of the tool.

A still further object of the invention is to provide a flaring tool of the character stated wherein provision is made for advancing the tube to be flared toward and against the flaring element, a swingable element mounting devices being provided which are so constructed and arranged as to be displaceable by endwise movement of the tube and in a manner for gradually changing the angle of the axis of the flaring frusto-cone as the flaring of the tube engaging the same is in progress.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevation illustrating a preferred form of the improved tube flaring tool, the rotor shifting lever being shown in its retracted position in full lines, in its rotor and flaring element projected position in dotted lines, and in a collapsed or tool compacted position in dot and dash lines.

FIGURE 2 is a left end elevation of the tool shown in FIGURE 1.

FIGURE 3 is an enlarged vertical cross section taken on the line 3—3 on FIGURE 1.

FIGURE 4 is an enlarged vertical longitudinal section taken axially through the tool shown in FIGURE 1, the rotor and the flaring element being shown in the retracted position with a tube and sleeve in place preparatory to the commencement of a flaring operation.

FIGURE 5 is an enlarged fragmentary vertical longitudinal section showing the flaring element advanced to complete the flaring operation.

FIGURE 6 is a detail vertical cross section taken on the line 6—6 on FIGURE 1.

FIGURE 7 is a fragmentary sectional view illustrating a modified form of reaction member in the shape of an elongated element dimensioned to engage within the tube to be flared and having a swivel connection with the flaring frusto-cone.

FIGURE 8 is a side elevation illustrating a modified form of flaring tool in which the flaring element is carried by a swingable yoke or arm arrangement adapted to be displaced in a gradual flaring operation as the tube being flared is forced endwise thereagainst, parts being broken away and in section.

FIGURE 9 is a longitudinal section taken on the line 9—9 on FIGURE 8.

FIGURE 10 is a fragmentary view illustrating the yoke as having been moved to bring about a progressive flaring of the engaging tube end.

FIGURE 11 is a left end view of the tool shown in FIGURE 10.

In the preferred form of the invention illustrated in FIGURES 1 through 6, the tool structure is designed as an attachment to be supported on and driven from a standard motor and housing sub-assembly of a hand drill, said sub-assembly being generally designated 15 ind including the handle 6 having the usual drive control trigger 7 for controlling the motor within the housing 8. The motor includes the usual drive shaft 9 and driver pinion 10 thereon.

The tool attachment includes a housing 11 removably secured to the motor housing 8 as shown and wherein a driven shaft 12 is rotatably supported in bearing means 13, said shaft having a driven gear 14 splined thereon at 15. The gear 14 is driven by a pinion 16 rotatable with a large idler gear 17 which is driven by the motor drive shaft pinion 10.

A rotor mounting ring 18 is splined and slidable at 19 on the drive shaft 12, and a flaring element carrying rotor 20 is secured on the ring 18, as at 21, said ring 18 being rotatable in bearings 22 within the shifter ring 23. It will be apparent by reference to FIGURES 1 and 4 of the drawings that the shifter ring 23 is disposed for abutment with the adjustable stop screw 24 mounted on the attachment housing 11.

The rotor 20 has a flaring element receiving socket or bore 25 therein disposed at an angle offcenter and wherein to receive the shank 26 of the flaring element including the stop shoulder or flange 27, the frusto-cone flaring portion 28 and the reaction ball extension 29, the latter having its center perfectly in line with the rotor axis, as will be clearly apparent by reference to FIGURE 4.

The flaring element has anti-friction bearing in needle bearing means 30 and in ball thrust bearing means 31 in the mounting socket 25 provided therefor in the rotor 20, and adjacent its inner end extremity, the shank 26 is notched at 32 to provide a retaining head 33. An arcuate groove 34 is cut in the outer surface of the rotor 20, and a half-circular locking member 35 is mounted in said groove, the same being pivoted intermediate its ends as at 36. One end of the locking member 35 is engaged by a socket mounted compression spring 37, said spring constantly tending to force said end 38 outwardly out of the rotor groove, and to yieldingly urge the member about its pivot 36 and force the other end 39 thereof inwardly into shank locking or retaining engagement in the shank groove 32. In this manner, the end 39 of the member is held in position for locking the removably mounted flaring tool shank 26 in operative position in the rotor socket and the end 38 of the locking member is placed so that it can be engaged by the finger of an operator and depressed to release the shank locking end 39 of the member 35 and permit withdrawal and replacement of a flaring element.

The housing 11 has an extension 40 including an upstanding wall portion 41, and a U-shaped end cap 42 secured on the extension as at 43, said cap having an end clearance 44 to permit placement of the tube 45 which is to be flared and the sleeve 46 surrounding said tube. The upright wall 41 has an upright bore 47 in which a stop pin 48 is mounted, said pin including a head 49 thereon which serves as a rest and a stop for the sleeve and its shoulder, limiting endwise movement of the sleeve toward the left as viewed in FIGURE 4, and the pin 48 is supported on a light compression spring 50 mounted in the bottom of the receiving bore 47.

The housing extension 40 also provides a shelf 51 whereon two opposed tube clamping members 52 are laterally-slidably mounted, a double or reversely threaded adjuster screw 53 being passed through suitably threaded bores in said members 52 so that upon turning of the handle 54, pin secured on the screw at 55, in one direction or the other, the clamp members may be moved toward or from each other to clamp or relieve clamping engagement of the opposing V-notches 56 of the members with the tube 45 which is to be flared.

A stirrup shifter 57 is pivotally mounted at 58 on the housing extension and has trunnion connection at 59 with the shifter ring 23, as best shown in FIGURES 1 and 2 of the drawings. A shifter lever or handle 60 is provided and has an enlarged end portion 61 which has slot and clamp screw connection at 62 with the stirrup so that by loosening the screw means 62 said enlarged end portion can be shifted longitudinally in the stirrup and thus permit locking placement of the cross pin 63 in the stirrup notches 64, or a removal of said cross pin from said notches to permit shifting and collapsing or compacting of the handle 60 from the full line position illustrated in FIGURE 1 to the dot and dash line position illustrated in said figure. A U-shaped rib member 65 is secured in inverted position at 66 beneath the housing 11, an end extremity 67 thereof being positioned to serve as a limiting stop for movement of the lever 60 in a direction for forcing the flaring element into the tube. The previously mentioned stop screw 24, when engaged by the shifting ring 23 as it is moved toward the right as viewed in FIGURES 1 and 4, will serve to limit retraction of the rotor 20 and the flaring element carried thereby, whereas the end extremity of the rib 65 serves as a stop at 67 limiting projection of the flaring element in the tube flaring direction in the manner previously stated. The rib 65 also serves as a means by which the tool can be mounted in a vise, although the tool may also be used entirely as a hand tool by supporting the same at the handle 6, if desired.

From the foregoing, it will be apparent that by manipulation of the handle 54, the clamping members 52 may be actuated to grip a tube 45 which is to be flared in the receiving notches 56, with the sleeve 46 surrounding said tube and resting on the pin 49 engaging the sleeve shoulder as a stop limiting endwise movement of the sleeve in the manner previously described. With the tube and sleeve thus mounted, the handle or lever 60 can be swung toward the dotted line position illustrated in FIGURE 1 to place the reaction ball 29 within the end of the tube with its center perfectly centered on the tube axis. By continuing the movement of the lever 60 to the right as viewed in FIGURE 1, assuming that rotation is being imparted to the rotor 20, the flaring frusto-cone portion 28 of the element will be brought against the end of the tube while the axis of the shank 26 of the flaring element is swinging about the axis of the rotor 20 and describing a frusto-cone figure of rotation, thereby flaring the end of the tube in the manner desired. Movement of the shifting ring 23 and rotor 20 in the direction stated will be limited by contact of the stirrup 57 with the adjacent end 67 of the rib 65. After the tube end flaring has been accomplished in the manner stated, the lever or handle 60 can be swung to the left as viewed in FIGURE 1 to retract the flaring element from the tube, and therefore movement is limited by contact of the shifter ring 23 with the adjustably mounted screw 24. While the ball extension 29 is in the end of the tube being flared and the flaring of the tube is being accomplished the snug engagement of the ball in the tube serves to absorb reaction forces incidental to the flaring operation, the frusto-cone figure of rotation being held accurately on the center line of the tube by the mounting of the rotor 20.

In FIGURE 7, there is shown a modified form of reaction member or extension which may be substituted for the ball extension previously described. This reaction member includes an elongated reaction body 68 which may be cylindrical in form and includes a well rounded lead end 69. This reaction member is swivelly connected at 70 to the frusto-cone flaring element 71 which includes the stop flange 72 and preferably is mounted and operates in the manner previously described. The reaction member or mandrel 68 serves a primary purpose of absorbing the reaction forces in the flaring operation, but it also serves to provide an elongated support against which thin walled tubes may be clamped to great advantage.

Another modified arrangement is shown in FIGURES 8 through 11. In these figures, there is illustrated a flaring attachment which may be hand drilled or otherwise driven, as in the previously disclosed form, but in which the tube is advanced toward the flaring devices, rather than the latter devices toward the tube. This modified arrangement includes a U-shaped yoke 73 having provision at 74 for connection with a driving means (not shown). Within the yoke opening a rocker member 75 is rockably mounted on a cross pin 76, said member having parallel arms 77 projecting radially therefrom. At their free ends, the rocker arms 77 provide trunnion bearing at 78 for a bearing block 79 in which the flaring tool spindle 80 is rotatably mounted in antifriction bearings 81. The tool spindle 80 carries thereon the tube flaring extension comprising the reaction ball 82, the frusto-cone flaring portion 83 and the stop shoulder or flange 84.

The block 79 has arms 85 extended forwardly therefrom, each carrying a roller 86 engaged in a slot 87 in one of the opposing inner faces of the yoke 73, as clearly illustrated in FIGURE 8. The slots 87 are disposed in parallel relation and in the same plane in which lies the axis of the tube 88 which is to be flared, the latter being accurately placed by the guide 89 along which the tube is slidable.

A compression spring 90 mounted in a socket 91 provided in the yoke 73 engages an abutment 92 on the rocker member 75 and constantly tends to force the rocker arms 77 against a stop closure pin 93 carried by the yoke 73.

When the rocker arms 77 are engaged with the stop pin 93, the block 79 will be positioned to place the axis of the shank 80 and the flaring frusto-cone extension 83 in coaxial alignment with the rotor and a tube which is to be flared and which is accurately placed by the slide guide 89. By now imparting rotation to the yoke 73 and placing a tube to be flared on the guide 89, said tube can be forced endwise into position for receiving the reaction ball 82 and engaging the end extremity of the tube with the abutment or flange 84 of the flaring element extension. Continued endwise movement imparted to the tube over the guide 89 will cause the spring 90 to be compressed and the arms 77 to swing upwardly, gradually increasing the angle of inclination of the block arms 85 and causing the center line of the tool frusto-cone 83 to describe an ever changing frusto cone figure of rotation and bring about the desired flaring of the tube end. Upon endwise withdrawal of the flared tube, the spring 90 will again return the arms 77 and 85 to the initial or tube receiving position previously described.

It will be apparent that by reason of the placement of the yoke slots 87 in parallel relation with each other and with the rotor axis and centered on the plane in which the rotor axis is located, the engagement of the rollers 86 in said slots serves always to hold the center of the reaction ball 82 on the rotor and tube axis during a tube flaring operation.

While example forms of the improved tube flaring tool structures have been described in detail herein, it is to be understood that modifications of the part structure and arrangements can be made without departing from the spirit of invention as defined in the appended claims.

I claim:

1. In a tube flaring tool, a tube flaring element including a frusto-cone flaring portion and a ball forming an axially aligned end extension on said portion and dimensioned to directly engage snugly as a reaction member in a tube to be flared, said frusto-cone flaring portion having an end directly secured to said ball with said end being of a lesser diameter than said ball, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube.

2. A structure as defined in claim 1 wherein the rotor is rotatably mounted in a housing and the tube supporting means includes clamping jaws supported by said housing, and wherein the means for placing the flaring element comprises an anti-friction bearing carried by the rotor, there also being included means for imparting rotation to the rotor, and means for shifting the rotor back and forth along its axis of rotation to project the flaring element into and retract the same from a tube supported in the clamping jaws.

3. In a tube flaring tool, a tube flaring element including a frusto-cone flaring portion and a ball forming an axially aligned end extension on said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an anti-friction bearing carried by the rotor, there also being means for imparting rotation to the rotor, and means for shifting the rotor back and forth along its axis of rotation to project the flaring element into and retract the same from a tube supported in the clamping jaws, said flaring element being withdrawable from its rotor mounting so that flaring elements of selective sizes can be mounted, and also having a notch therein, and the rotor having an arcuate groove in its periphery, and there being an arcuate member pivotally mounted in the groove intermediately of the ends thereof with spring means projecting one end of the arcuate member from the groove in finger engaging position and yieldably holding the other end of said arcuate member in the flaring element notch to removably secure said element in its mounting.

4. In a tube flaring tool, a tube flaring element including a frusto-cone flaring portion and a ball forming an axially aligned end extension on said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an anti-friction bearing carried by the rotor, there also being means for imparting rotation of the rotor, and means for shifting the rotor back and forth along its axis of rotation to project that flaring element into and retract the same from a tube supported in the clamping jaws, said shifting means comprising a shifter ring having rotary bearing on the rotor, and stirrup shifter handle having a pivot mounting on the housing and trunnion connection with the shifter ring.

5. In a tube flaring tool, a tube flaring element including a frusto-cone flaring portion and a ball forming an axially aligned end extension on said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an anti-friction bearing carried by the rotor, there also being means for imparting rotation to the rotor, and means for shifting the rotor back and forth along its axis of rotation to project the flaring element into and retract the same from a tube supported in the clamping jaws, said shifting means comprising a shifter ring having rotary bearing on the rotor, a stirrup having a pivot mounting on the housing and trunnion connection with the shifter ring, and a handle telescopically and pivotally mounted on the stirrup shifter and having pin and notch connection therewith permitting the handle to be moved to release the pin and notch connection and then swung to a compacting position adjacent the housing.

6. In a tube flaring tool, a tube flaring element including a frusto-cone flaring portion and a ball forming an axially aligned end extension on said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an anti-friction bearing carried by the rotor, there also being means for imparting rotation to the rotor, and means for shifting the rotor back and forth along its axis of rotation to project the flaring element into and retract the same from a tube supported in the clamping jaws, said shifting means comprising a shifter ring having rotary bearing on the rotor, and stirrup shifter handle having a pivot mounting on the housing and trunnion connection with the shifter ring, and there also being included means for limiting shifting movement of the rotor in both directions along its axis.

7. In a tube flaring tool, a tube flaring element including a frusto-cone flaring portion and a ball forming an axially aligned end extension of said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an antifriction bearing carried by the rotor, there also being means for imparting rotation to the rotor, and means for shifting the rotor back and forth along its axis of rotation to project the flaring element into and retract the same from a tube supported in the clamping jaws, said shifting means comprising a shifter ring having rotary bearing on the rotor, and stirrup shifter handle having a pivot mounting on the housing and trunnion connection with the shifter ring, and there also being means for limiting shifting movement of the rotor in both directions along its axis, said last named means comprising a stop screw adjustably mounted on the housing to be engageable by the shifter ring, and a stop member secured to the housing in position to be engaged by the stirrup shifter.

8. A structure as defined in claim 1 wherein the rotor is rotatably mounted in a housing and the tube supporting means includes clamping jaws supported by said housing, and wherein the means for placing the flaring element comprises an anti-friction bearing carried by the rotor, there also being included means for imparting rotation to the rotor, and means for shifting the rotor back and forth along its axis of rotation to project the flaring element into and retract the same from a tube supported in the clamping jaws, said housing also serving to mount a cushion spring supported headed pin disposed in position for providing a rest for a shouldered sleeve when one is surrounding the end of a tube to be flared and a stop engageable by the sleeve shoulder to prevent endwise movement of the sleeve along the tube during a flaring operation.

9. In a tube flaring tool, a tube flaring element including a frusto-cone flaring portion and a ball forming an axially aligned end extension on said portion and dimensioned to engage snugly as a reaction member in a tube to be flared, a rotor supporting said flaring element with its ball center always disposed on the axis of rotation of the rotor, means for supporting a tube to be flared with its axis aligned with said rotor axis, and means for placing the flaring element with the frusto-cone flaring portion in angular relation to the rotor and tube axis whereby upon rotation of the rotor and engagement of said frusto-cone portion with the tube the axis of the frusto-cone portion will describe a frusto-cone figure of rotation resulting in a flaring of the tube, the rotor being rotatably mounted in a housing and the tube supporting means including clamping jaws supported by said housing, and the means for placing the flaring element comprising an anti-friction bearing carried by the rotor, there also being means for imparting rotation to the rotor, and means for shifting the rotor back and forth along its axis of rotation to project the flaring element into and retract the same from a tube supported in the clamping jaws, said rotation imparting means comprising a driving motor in a standard hand drill sub-assembly removably secured to the housing in a fixed position and a gear couple operatively connecting said motor with the rotor.

10. A structure as defined in claim 1 wherein the rotor is rotatably mounted in a housing and the tube supporting means includes clamping jaws supported by said housing, and wherein the means for placing the flaring element comprises an anti-friction bearing carried by the rotor, there also being included means for imparting rotation to the rotor, and means for shifting the rotor back and forth along its axis of rotation to project the flaring element into and retract the same from a tube supported in the clamping jaws, and said housing having a rib-like member rigidly secured thereto and depending therefrom subject to being clamped in a vise to provide a rigid support for the tool.

11. For use in a power driven tube flaring tool, a removably and replaceably mountable flaring element comprising a mounting shank, a tube engagement limiting shoulder flange on said shank and disposed normal to the axis of the flaring element, a frusto-conical flaring portion having a large end and a small end with said large end connected to said shank at said shoulder flange, and a reaction ball end portion directly secured to said flaring portion small end, said reaction ball end portion being of an extent in excess of semi-spherical and being of a greater diameter than said small end with said reaction ball end portion cooperating with said shoulder flange to limit the extent of flaring by the flaring element to the length of said frusto-conical flaring portion.

12. Apparatus as defined in claim 1 wherein the tube supporting means comprises a guide along which the tube is slidable toward the rotor, and wherein the flaring element placing means comprises a swingably mounted block in which the flaring element is mounted, and swingably mounted arm means supporting the block whereby as the rotor is rotated and the tube to be flared is moved endwise over the reaction ball and against the frusto-cone flaring portion the angular relation of said arm means will be altered to gradually change the angular position of the frusto-conical flaring portion in the tube end and bring about a progressive flaring of the tube end engaged by said flaring portion.

13. A structure as defined in claim 1 wherein said rotor is yoke shaped and has a central opening therein, a rocker member is rockably mounted in said opening and has parallel arm extensions, a bearing block is swingably mounted on said arms, said tube flaring element is carried by said block, said rotor has opposing longitudinal slots therein opening into the central opening and centered on the plane in which the rotor axis is located, said block includes arm extensions having lateral projections engaged in and movable along said slots and cross aligned with the center of said ball extension whereby as the rotor is rotated and the tube to be flared is moved endwise over the reaction ball and against the frusto-cone flaring portion the angular relation of said block and the arms on which it is swingably mounted will be altered to gradually change the angular position of the frusto-conical flaring portion in the tube end and bring about a progressive flaring of the tube end engaged by said flaring portion, the reaction ball center being held on the rotor and tube axis by the engagement of the block arm lateral extensions in said aligned slots.

14. Flaring tool structure as defined in claim 13 wherein there is included spring means constantly tending to swing the rocker member to present the flaring element axis in coaxial alignment with the rotor axis, and stop means for limiting movement of the rocker at said axis aligning position.

15. Flaring tool structure as defined in claim 13 wherein the tube flaring element includes a stop shoulder engageable by the end of a tube to be flared and a shank portion rotatably mounted in anti-friction bearing means in the bearing block, and wherein the block arm lateral extensions have anti-friction rollers therein accurately engaging and rollable in the rotor opening slots.

16. Flaring tool structure as defined in claim 13 wherein there is included spring means constantly tending to swing the rocker member to present the flaring element axis in coaxial alignment with the rotor axis, and stop means for limiting movement of the rocker at said axis aligning position, and wherein the tube flaring element includes a stop shoulder engageable by the end of a tube to be flared and a shank portion rotatably mounted in anti-friction bearing means in the bearing block, and the block arm lateral extensions have antifriction rollers therein accurately engaging and rollable in the rotor opening slots.

17. A structure as defined in claim 4 wherein there is also a stop screw adjustably mounted on the housing to be engageable by the shifter ring to limit the rearward shifting movement of the rotor along its axis.

18. In a tube flaring tool, a tube flaring element including a frusto-conical flaring portion, a ball projecting from and forming a terminal projecting extension on said flaring portion, said ball being of generally the same diameter as the internal diameter of the tube to be flared and being snugly engageable in the tube as a reaction member, said ball having an extent in excess of semi-spherical and the end of said frusto-conical flaring portion connected to said ball being of a lesser diameter than the diameter of said ball, a tube end engageable stop flange immediately adjacent said flaring portion remote from said ball and normal to the axis of said flaring element to limit the engagement of said tube flaring element within the tube and thusly limiting the width of the resultant tube flare to the length of said frusto-conical flaring portion, and a rotor supporting said flaring element for rotation therewith with the ball center always disposed on the axis of rotation of said rotor not withstanding an angular relationship of the axis of said flaring element relative to the axis of rotation of said rotor.

References Cited in the file of this patent

UNITED STATES PATENTS

| | | |
|---|---|---|
| 782,004 | Chandler | Feb. 7, 1905 |
| 843,198 | Doolittle | Feb. 5, 1907 |
| 1,594,114 | Prout | July 27, 1926 |
| 1,775,766 | Holmes | Sept. 16, 1930 |
| 1,914,235 | Benbow | June 13, 1933 |
| 1,935,714 | Hummell | Nov. 21, 1933 |
| 2,357,748 | Lyon | Sept. 5, 1944 |
| 2,421,667 | Veit et al. | June 3, 1947 |
| 2,442,224 | Vaill | May 25, 1948 |
| 2,482,490 | Kaas | Sept. 20, 1949 |
| 2,739,726 | Bregen | Mar. 27, 1956 |

FOREIGN PATENTS

| | | |
|---|---|---|
| 706,615 | Germany | May 30, 1941 |
| 63,422 | Denmark | Apr. 23, 1945 |
| 977,585 | France | Nov. 15, 1950 |